(12) United States Patent
Lee et al.

(10) Patent No.: US 8,631,297 B2
(45) Date of Patent: *Jan. 14, 2014

(54) METHOD FOR MAPPING PHYSICAL HYBRID AUTOMATIC REPEAT REQUEST INDICATOR CHANNEL

(71) Applicant: Pantech Co., Ltd., Seoul (KR)

(72) Inventors: Jung Hoon Lee, Anyang-si (KR); Joon Kui Ahn, Anyang-si (KR)

(73) Assignee: Pantech Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/750,669

(22) Filed: Jan. 25, 2013

(65) Prior Publication Data

US 2013/0114551 A1  May 9, 2013

Related U.S. Application Data

(63) Continuation of application No. 13/012,702, filed on Jan. 24, 2011, which is a continuation of application No. 12/388,243, filed on Feb. 18, 2009, now Pat. No. 7,894,330.

(60) Provisional application No. 61/029,895, filed on Feb. 19, 2008.

(30) Foreign Application Priority Data

Dec. 8, 2008 (KR) .................. 10-2008-0124084

(51) Int. Cl.
H04L 1/18 (2006.01)
(52) U.S. Cl.
USPC ................ 714/749; 367/208; 367/329
(58) Field of Classification Search
USPC .................. 714/749; 370/208, 329
See application file for complete search history.

(56) References Cited

U.S. PATENT DOCUMENTS 7,990,920 B2  8/2011  Zhang et al.
2007/0171864 A1  7/2007  Zhang et al.
(Continued)

FOREIGN PATENT DOCUMENTS

KR  10-2006-0117864  11/2006
KR  10-2007-0027468  3/2007
(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 8)," Nov. 1, 2007, XP050377533, pp. 1-54.

(Continued)

Primary Examiner — Sam Rizk
(74) Attorney, Agent, or Firm — IP & T Group LLP

(57) ABSTRACT

A method for mapping a physical hybrid automatic repeat request indicator channel (PHICH) is described. The method for mapping a PHICH includes determining an index of a resource element group transmitting a repetitive pattern of the PHICH, according to a ratio of the number of available resource element groups in a symbol in which the PHICH is transmitted and the number of available resource element groups in a first or second OFDM symbol, and mapping the PHICH to the symbol according to the determined index. In transmitting the PHICH, since efficient mapping is performed considering available resource elements varying with OFDM symbols, repetition of the PHICH does not generate interference between neighbor cell IDs and performance is improved.

20 Claims, 11 Drawing Sheets

(56) References Cited

U.S. PATENT DOCUMENTS

| | | | |
|---|---|---|---|
| 2007/0242636 | A1 | 10/2007 | Kashima et al. |
| 2008/0095040 | A1 | 4/2008 | Kwon et al. |
| 2008/0233966 | A1 | 9/2008 | Scheim et al. |
| 2009/0097447 | A1 | 4/2009 | Han et al. |
| 2009/0109906 | A1 | 4/2009 | Love et al. |
| 2009/0116573 | A1 | 5/2009 | Gaal et al. |
| 2009/0147743 | A1 | 6/2009 | Parkvall et al. |
| 2010/0067445 | A1 | 3/2010 | Rinne et al. |
| 2010/0118800 | A1 | 5/2010 | Kim et al. |
| 2010/0260115 | A1 | 10/2010 | Frederiksen et al. |
| 2012/0063384 | A1 * | 3/2012 | Bi et al. ........................ 370/315 |

FOREIGN PATENT DOCUMENTS

| | | |
|---|---|---|
| KR | 10-2008-0086317 | 9/2008 |
| KR | 10-2009-0034263 | 4/2009 |
| KR | 10-2009-0064299 | 6/2009 |

OTHER PUBLICATIONS

"Text proposal for PHICH to RE mapping with cell ID," 3GPP Draft, R1-081063, TP for PHICH mapping with Cell ID_Cosources, Feb. 15, 2008, XP050109516, pp. 1-3.

International Search Report dated Jul. 31, 2009 issued for PCT/KR2009/000701.

Non-Final Office Action dated Aug. 18, 2010 issued for U.S. Appl. No. 12/388,243.

Notice of Allowance dated Dec. 16, 2010 issued for U.S. Appl. No. 12/388,243.

Kim et al. "OFDMA-based reliable multicasting MAC protocol for WLANs," IEEE Transactions on Vehicular Technology, Sep. 2008.

Kim et al. "Reliable wireless multicasting with minimum overheads in OFDM-based WLANs," IEEE International Conference on Communication, May 2008.

* cited by examiner

FIG.5

METHOD FOR MAPPING PHYSICAL HYBRID AUTOMATIC REPEAT REQUEST INDICATOR CHANNEL

CROSS-REFERENCE TO RELATED APPLICATIONS

This application is a continuation of co-pending U.S. patent application Ser. No. 13/012,702, filed on Jan. 24, 2011, which is a continuation of U.S. patent application Ser. No. 12/388,243, filed on Feb. 18, 2009, now issued as U.S. Pat. No. 7,894,330, all of which claim priority from and the benefit of U.S. Provisional Application Ser. No. 61/029,895, filed on Feb. 19, 2008, and Korean Patent Application No. 10-2008-0124084, filed on Dec. 8, 2008, which are all hereby incorporated by reference for all purposes as if fully set forth herein.

BACKGROUND

1. Field

The present invention relates to a mapping method for frequency and orthogonal frequency division multiplexing (OFDM) symbol regions of a signal transmitted on downlink in a cellular OFDM wireless packet communication system.

2. Discussion of the Background

When transmitting/receiving a packet in a mobile communication system, a receiver should inform a transmitter as to whether or not the packet has been successfully received. If the reception of the packet is successful, the receiver transmits an acknowledgement (ACK) to cause the transmitter to transmit a new packet. If the reception of the packet fails, the receiver transmits a negative acknowledgement (NACK) to cause the transmitter to re-transmit the packet. Such a process is called automatic repeat request (ARQ). Meanwhile, hybrid ARQ (HARQ), which is a combination of the ARQ operation and a channel coding scheme, has been proposed. HARQ lowers an error rate by combining a re-transmitted packet with a previously received packet and improves overall system efficiency. In order to increase throughput of the system, HARQ demands a rapid ACK/NACK response from the receiver compared with a conventional ARQ operation. Therefore, the ACK/NACK response in HARQ is transmitted by a physical channel signaling method. The HARQ scheme may be broadly classified into chase combining (CC) and incremental redundancy (IR). The CC method serves to re-transmit a packet using the same modulation method and the same coding rate as those used when transmitting a previous packet. The IR method serves to re-transmit a packet using a different modulation method and a different coding rate from those used when transmitting a previous packet. In this case, the receiver can raise system performance through coding diversity.

In a multi-carrier cellular mobile communication system, mobile stations belonging to one or a plurality of cells transmit an uplink data packet to a base station. That is, since a plurality of mobile stations within one sub-frame can transmit an uplink data packet, the base station must be able to transmit ACK/NACK signals to a plurality of mobile stations within one sub-frame. If the base station multiplexes a plurality of ACK/NACK signals transmitted to the mobile stations within one sub-frame using CDMA scheme within a partial time-frequency region of a downlink transmission band of the multi-carrier system, ACK/NACK signals with respect to other mobile stations are discriminated by an orthogonal code or a quasi-orthogonal code multiplied through a time-frequency region. If quadrature phase shift keying (QPSK) transmission is performed, the ACK/NACK signals may be discriminated by different orthogonal phase components.

When transmitting the ACK/NACK signals using CDMA multiplexing scheme in order to transmit a plurality of ACK/NACK signals within one sub-frame, a downlink wireless channel response characteristic should not be greatly varied in a time-frequency region in which the ACK/NACK signals are transmitted. This is because if orthogonality is maintained between the multiplexed different ACK/NACK signals, a receiver can obtain satisfactory reception performance without applying a special receiving algorithm such as channel equalization. Accordingly, the CDMA multiplexing of the ACK/NACK signals should be performed within the time-frequency region in which a wireless channel response is not significantly varied. However, if the wireless channel quality of a specific mobile station is poor in the time-frequency region in which the ACK/NACK signals are transmitted, the ACK/NACK reception performance of the mobile station may also be greatly lowered.

Accordingly, the ACK/NACK signals transmitted to any mobile station within one sub-frame may be repeatedly transmitted over separate time-frequency regions in a plurality of time-frequency axes, and the ACK/NACK signals may be multiplexed with ACK/NACK signals transmitted to other mobile stations by CDMA in each time-frequency region. Therefore, the receiver can obtain a time-frequency diversity gain when receiving the ACK/NACK signals.

However, in a conventional physical hybrid ARQ indicator channel (PHICH) mapping method, there exists a defect that PHICH groups between neighbor cells have difficulty avoiding collision as illustrated in FIG. 1.

SUMMARY

An object of the present invention devised to solve the problem lies in providing a method for mapping a PHICH so that repetition of the PHICH does not generate interference between neighbor cell IDs by considering available resource elements varying with OFDM symbols.

The object of the present invention can be achieved by providing a method for mapping a PHICH, including determining an index of an OFDM symbol in which a PHICH group is transmitted, determining an index of a resource element group transmitting a repetitive pattern of the PHICH group, according to a ratio of the number of available resource element groups in the determined OFDM symbol and the number of available resource element groups in a first or second OFDM symbol, and mapping the PHICH group according to the determined index.

The PHICH may be transmitted in units of a plurality of PHICH groups, and an index of an OFDM symbol in which an i-th repetitive pattern is transmitted may be defined by the following equation:

$$l'_i = \begin{cases} 0 & \text{normal } PHICH \text{ duration,} \\ & \text{all subframes} \\ i & \text{extended } PHICH \text{ duration,} \\ & \text{non-}MBSFN \text{ subframes} \\ (\lfloor m'/2 \rfloor + i + 1) \bmod 2 & \text{extended } PHICH \text{ duration,} \\ & MBSFN \text{ subframes} \end{cases}$$

where m' denotes an index of a PHICH group

The index of the resource element group may be determined according to a value obtained by multiplying the ratio by a cell ID.

The index of the resource element group may be determined by the following equation:

$$\bar{n}_i = \begin{cases} \left(\left\lfloor \left(N_{ID}^{cell} \cdot n'_{l'_i}/n'_0\right)\right\rfloor + m'\right) \bmod n'_{l'_i}, & i = 0 \\ \left(\left\lfloor \left(N_{ID}^{cell} \cdot n'_{l'_i}/n'_0\right)\right\rfloor + m' + \lfloor n'_{l'_i}/3 \rfloor\right) \bmod n'_{l'_i}, & i = 1 \\ \left(\left\lfloor \left(N_{ID}^{cell} \cdot n'_{l'_i}/n'_0\right)\right\rfloor + m' + \lfloor 2n'_{l'_i}/3 \rfloor\right) \bmod n'_{l'_i}, & i = 2 \end{cases}$$

where $N_{ID}^{cell}$ denotes a cell ID, i denotes an index of a repetitive pattern, $n'_{l'_i}/n'_0$ denotes a ratio between the number of available resource element groups in an OFDM symbol $l'_i$ and the number of available resource element groups in a first OFDM symbol, and m' denotes an index of a PHICH group.

In accordance with another aspect of the present invention, there is provided a method for mapping a PHICH, including determining an index of a resource element group transmitting a repetitive pattern of the PHICH, according to a ratio of the number of available resource element groups in a symbol in which the PHICH is transmitted and the number of available resource element groups in a second OFDM symbol, and mapping the PHICH to the symbol according to the determined index.

The PHICH may be transmitted in units of a plurality of PHICH groups each consisting of four resource elements.

The PHICH may be transmitted in units of a plurality of PHICH groups each consisting of two resource elements.

The index of the resource element group may be determined by the following equation:

$$\bar{n}_i = \begin{cases} \left(\left\lfloor \left(N_{ID}^{cell} \cdot n'_{l'_i}/n'_1\right)\right\rfloor + m'\right) \bmod n'_{l'_i}, & i = 0 \\ \left(\left\lfloor \left(N_{ID}^{cell} \cdot n'_{l'_i}/n'_1\right)\right\rfloor + m' + \lfloor n'_{l'_i}/3 \rfloor\right) \bmod n'_{l'_i}, & i = 1 \\ \left(\left\lfloor \left(N_{ID}^{cell} \cdot n'_{l'_i}/n'_1\right)\right\rfloor + m' + \lfloor 2n'_{l'_i}/3 \rfloor\right) \bmod n'_{l'_i}, & i = 2 \end{cases}$$

where $N_{ID}^{cell}$ denotes a cell ID, i denotes an index of a repetitive pattern, $n'_{l'_i}/n'_1$ denotes a ratio between the number of available resource element groups in an OFDM symbol $l'_i$ and the number of available resource element groups in a second OFDM symbol, and m' denotes an index of a PHICH group.

According to the exemplary embodiment of the present invention, efficiency mapping is performed by considering available resource elements varying according to OFDM symbols during PHICH transmission, so that PHICH repetition does not generate interference between neighbor cell IDs and performance is improved.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIGS. 4 and 5 illustrate examples of mapping a PHICH when a spreading factor is 4;

DETAILED DESCRIPTION OF THE ILLUSTRATED EMBODIMENTS

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention.

When transmitting data through downlink of an OFDM wireless packet communication system, a channel transmitting ACK/NACK signals may be referred to as a physical hybrid ARQ indicator channel (PHICH).

In a $3^{rd}$ generation partnership project (3GPP) long term evolution (LTE) system, the PHICH is repeatedly transmitted three times in order to obtain diversity gain. Through how many OFDM symbols the PHICH is transmitted is determined depending on information transmitted through a primary broadcast channel (PBCH) and on whether or not a subframe is for multicast broadcast over single frequency network (MBSFN). If the PHICH is transmitted through one OFDM symbol, the PHICH repeating three times should be evenly distributed over a frequency bandwidth of one OFDM symbol. If the PHICH is transmitted through three OFDM symbols, each repetition is mapped to a corresponding OFDM symbol.

Figure 1:
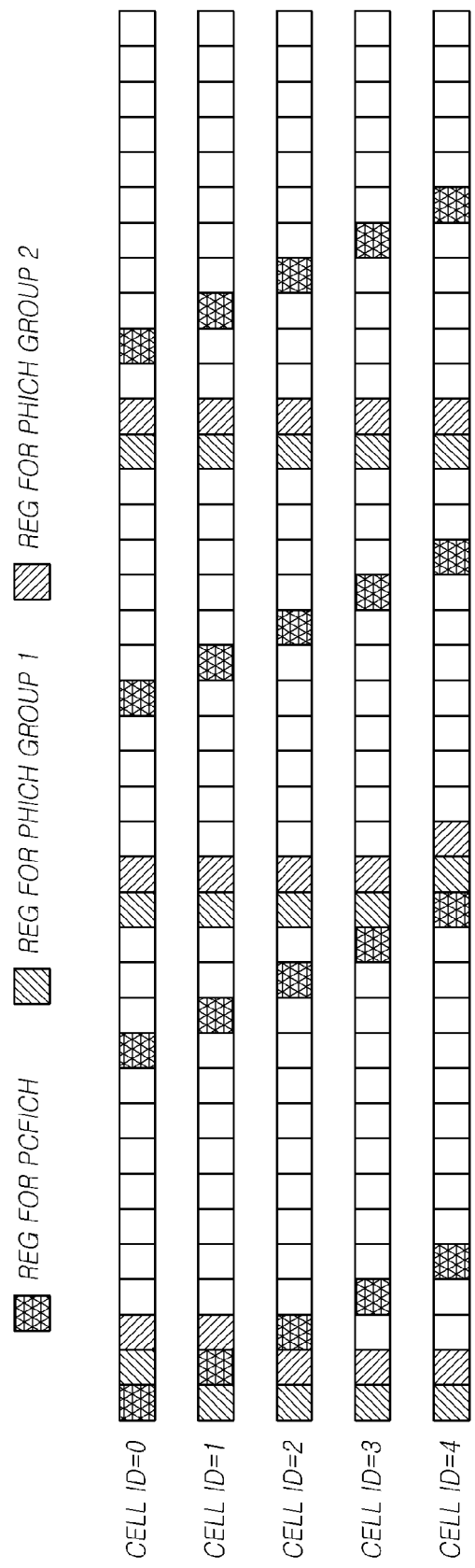
FIG. 1 illustrates an example of a conventional PHICH mapping method.
Figure 2:
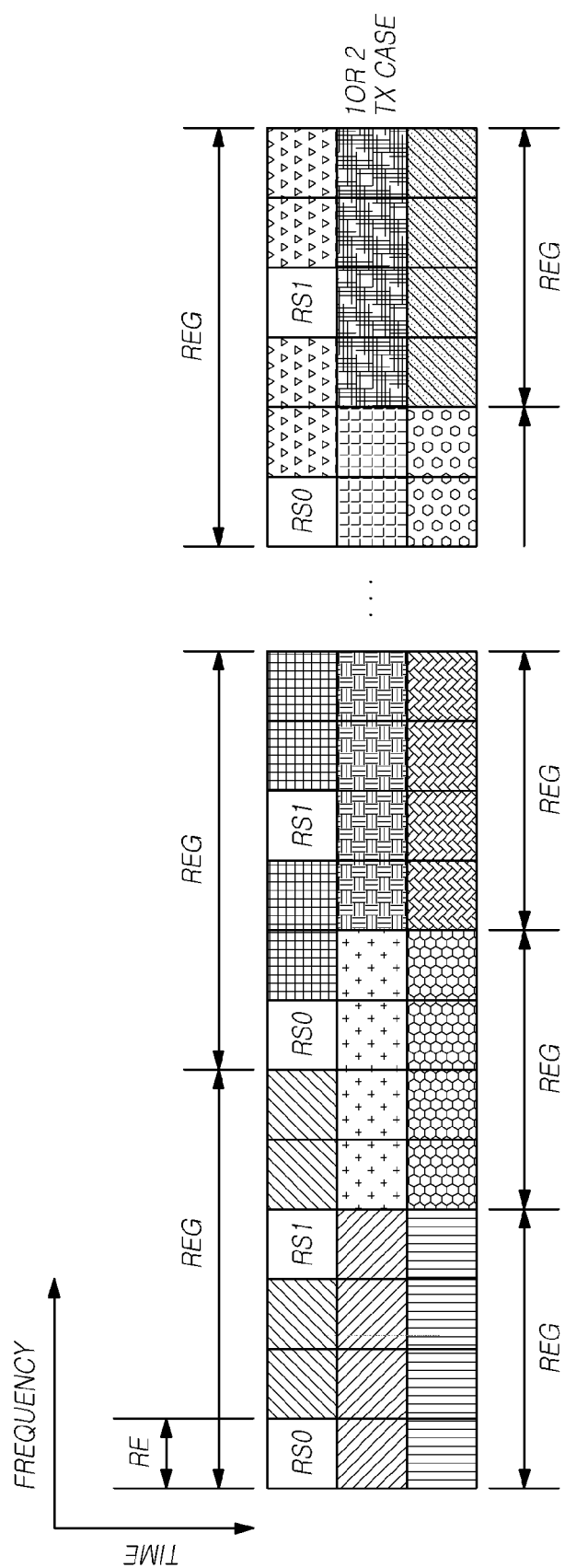
FIGS. 2 and 3 illustrate resource element groups to which a PHICH is mapped.
Figure 3:
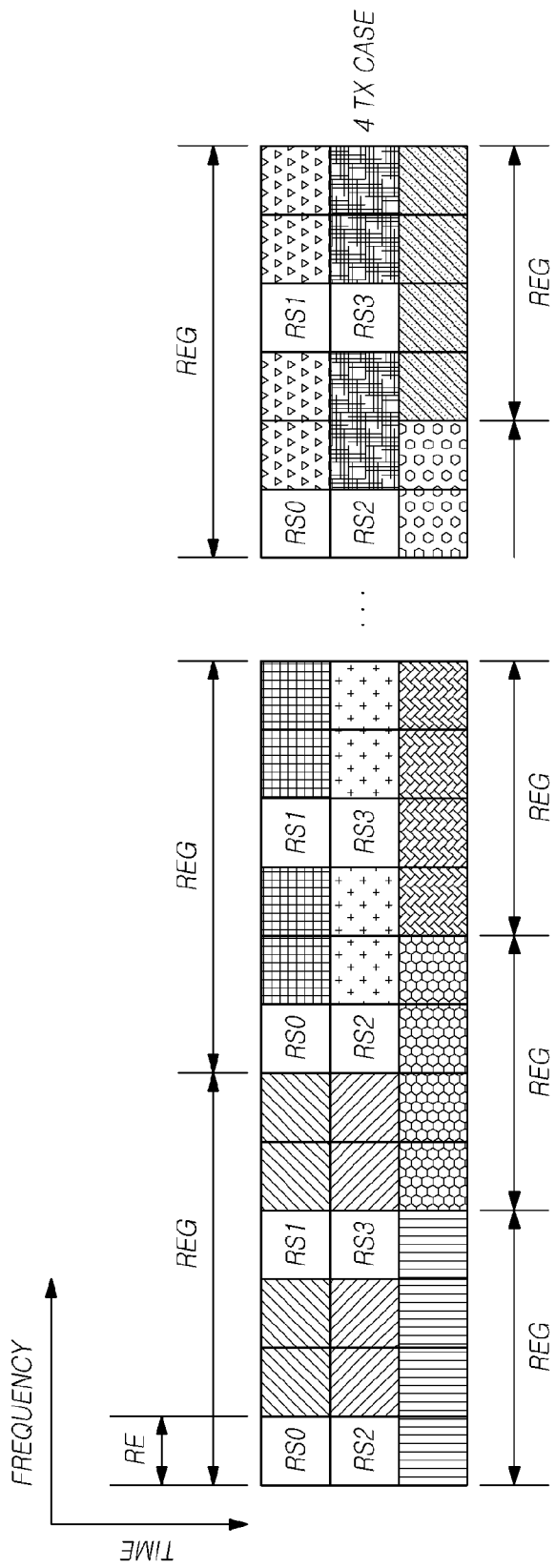

FIGS. 2 and 3 illustrate resource element groups (REGs) to which the PHICH is mapped.

Each REG is comprised of four resource elements. Since a first OFDM symbol includes reference signals RS0 and RS1, locations except for the reference signal locations are available for the resource elements. In FIG. 3, even a second OFDM symbol includes reference signals RS2 and RS3.

Figure 4:
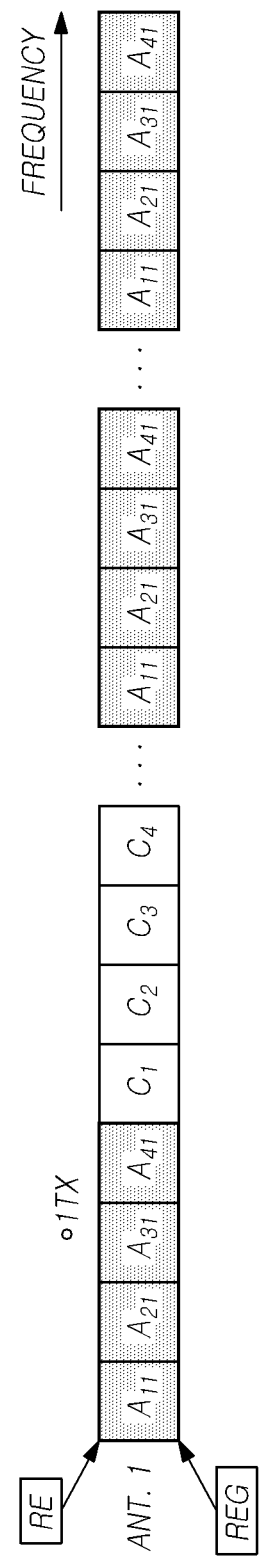
Figure 5:
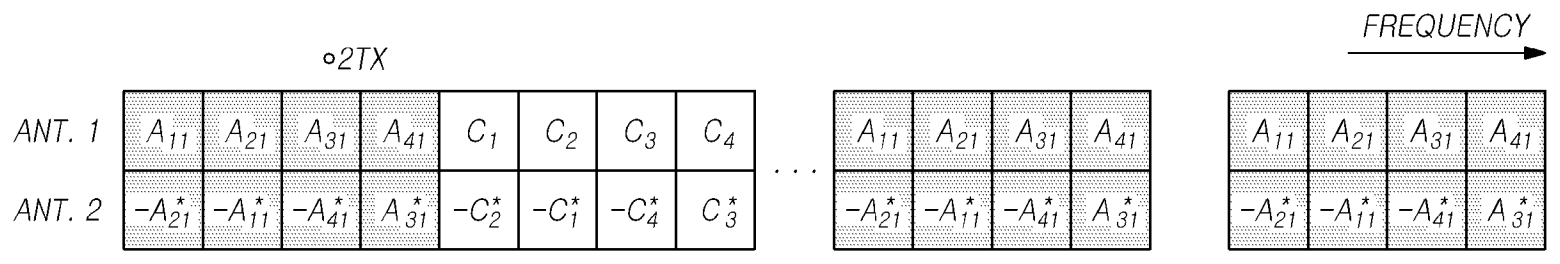

FIGS. 4 and 5 illustrate examples of mapping a PHICH when a spreading factor (SF) is 4. When an SF is 4, one repetition of one PHICH group is mapped to one REG.

In FIGS. 4 and 5, precoding for transmit diversity is applied. $A_{11}$, $A_{21}$, $A_{31}$, and $A_{41}$ denote resource elements of an REG constituting a specific PHICH. $C_1$, $C_2$, $C_3$, and $C_4$ denote resource elements of an REG for PCHICH or a physical downlink control channel (PDCCH). FIGS. 4 and 5 correspond to the cases where the number of antennas is 1 and 2, respectively, when reference signals are not considered.

Figure 6:
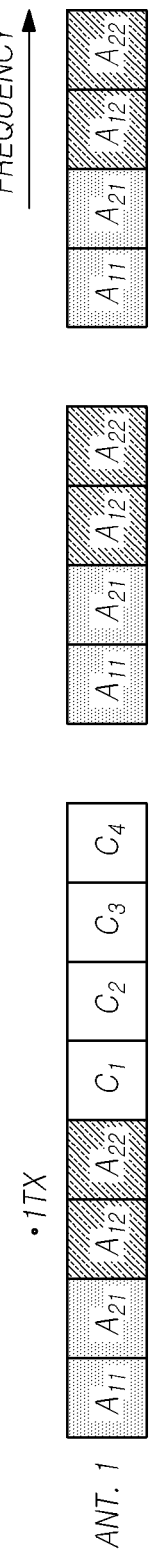
FIGS. 6 and 7 illustrate examples of mapping a PHICH when a spreading factor is 2.
Figure 7:
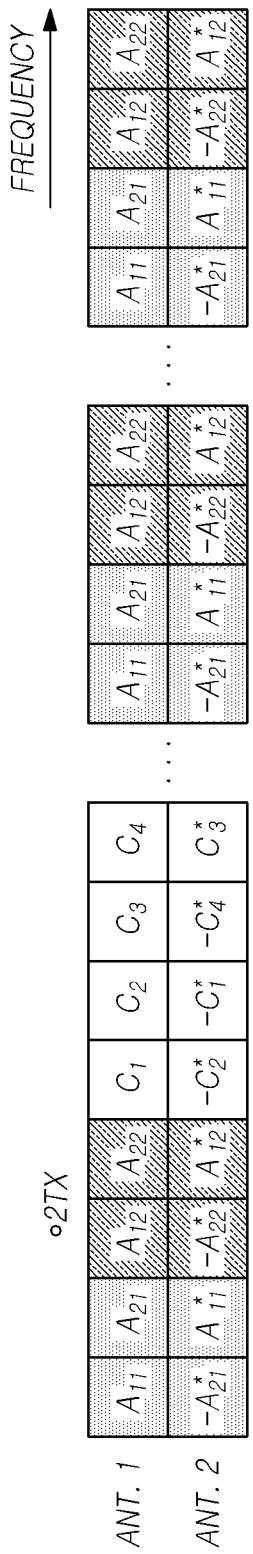

FIGS. 6 and 7 illustrate examples of mapping a PHICH when an SF is 2. When an SF is 2, one repetition of two PHICH groups is mapped to one REG.

Precoding for transmit diversity is applied to FIGS. 6 and 7. FIGS. 6 and 7 correspond to the cases where the number of antennas is 1 and 2, respectively, when reference signals are not considered.

In actual implementation as illustrated in FIGS. 2 and 3, it should be considered that the number of available REGs in an OFDM symbol including reference signals is not equal to the number of available REGs in an OFDM symbol which does not include reference signals.

Meanwhile, if a sequence for mapping the PHICH is denoted as $\bar{y}^{(p)}(0)$, K, $\bar{y}^{(p)}(M_{symb}-1)$, then $\bar{y}^{(p)}(n)$ satisfies $\bar{y}^{(p)}(n)=\Sigma y^{(p)}(n)$, which indicates the sum of all PHICHs in one PHICH group. $y_i^{(p)}(n)$ denotes an i-th PHICH in a specific PHICH group. In this case, $z^{(p)}(i)=\{y^{(p)}(4i), y^{(p)}(4i+1), y^{(p)}(4i+2), y^{(p)}(4i+3)\}$ (where i=0, 1, 2) denotes a symbol quadruplet for an antenna port p.

An index of a PHICH group has m'=0 as an initial value. A symbol quadruplet $z^{(p)}(i)$ at m' is mapped to an REG of (k', l')$_i$ (where l'$_i$ is an index of an OFDM symbol in which i-th repetition of a PHICH group is transmitted, and k'$_i$ is an index of a frequency domain).

When a PHICH is transmitted through two OFDM symbols, the PHICH is repeated twice upon a first OFDM symbol and repeated once upon a second OFDM symbol according to a transmitted PHICH group. Conversely, the PHICH may be repeated once upon the first OFDM symbol and repeated twice upon the second OFDM symbol. This may be expressed by the following Equation 1.

$$l'_i = \begin{cases} 0 & \text{normal PHICH duration, all subframes} \\ i & \text{extended PHICH duration, non-MBSFN subframes} \\ (\lfloor m'/2 \rfloor + i + 1) \bmod 2 & \text{extended PHICH duration, MBSFN subframes} \end{cases} \quad \text{[Equation 1]}$$

In Equation 1, l'$_i$ denotes an index of an OFDM symbol in which i-th repetition of a PHICH group is transmitted, m' denotes an index of a PHICH group, and i denotes the number of repetitions of a PHICH. When the PHICH is repeated three times, i has values of 0, 1, and 2.

Figure 8:
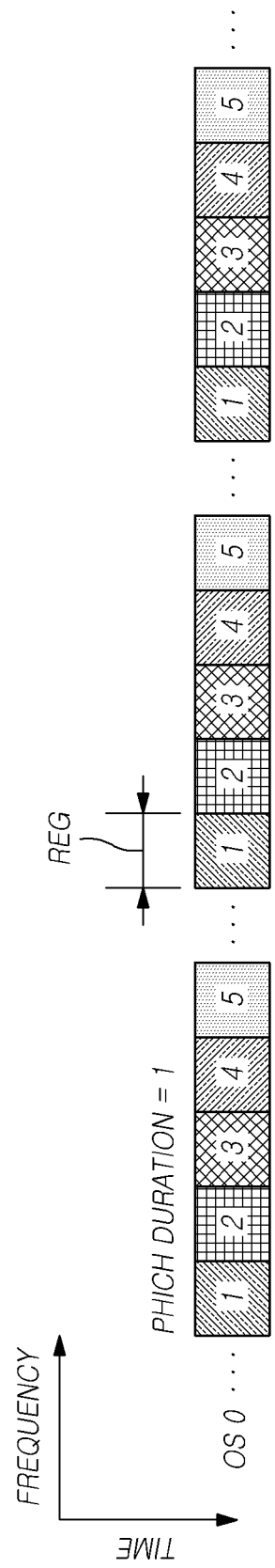
FIGS. 8 to 10 illustrate examples of repetitive mapping of a PHICH applied to the present invention.
Figure 9:
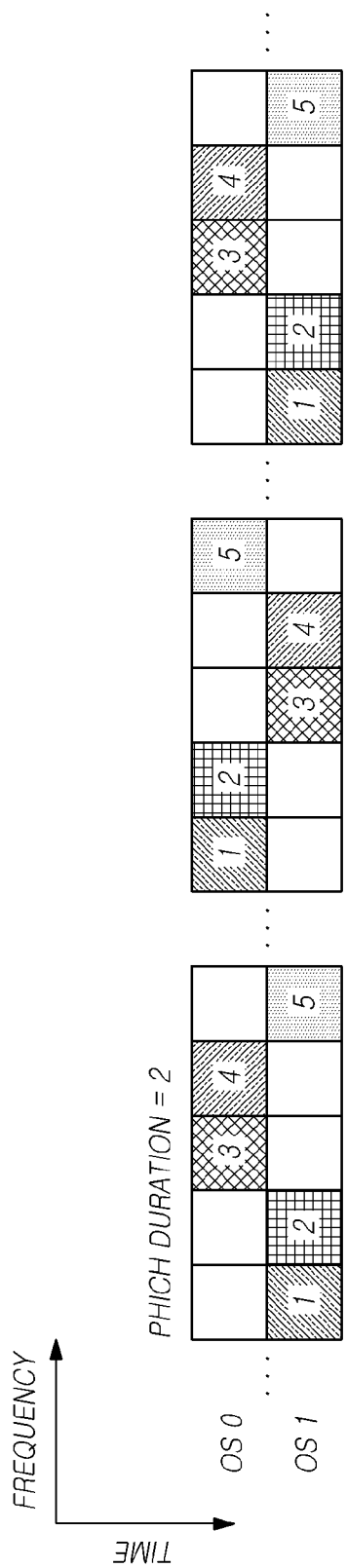
Figure 10:
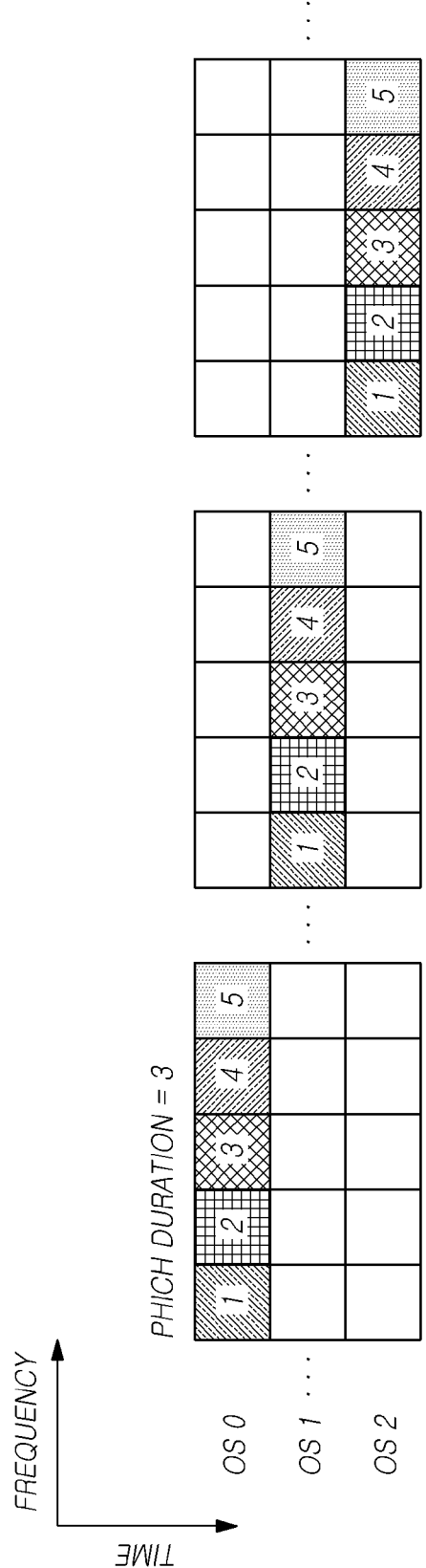

FIGS. 8 to 10 illustratively show Equation 1.

FIGS. 8 and 9 show the cases where l'$_i$=0 and l'$_i$=($\lfloor$m'/2$\rfloor$+i+1)mod 2, respectively. FIG. 10 shows the case where l'$_i$=i and a PHICH group is repeated at a PHICH duration of 3.

A PHICH, which is an important channel for transmitting ACK/NACK signals indicating whether or not data has been received, should be transmitted as stably as possible. Further, since ACK/NACK signals should be transmitted to a user even in a cell edge, substantial power is used compared with other channels. If locations for transmitting the PHICHs in respective cells are the same, PHICH transmission performance may be deteriorated due to interference caused by transmission of the PHICH between neighbor cells. Accordingly, if transmission locations of the PHICH in respective cells differ, interference caused by transmission of the PHICH between neighbor cells is reduced. Consequently, PHICH transmission performance can be improved. Namely, if mapping locations of the PHICH are determined according to cell IDs, the above-described problem can be solved. The PHICH is repeatedly transmitted three times to obtain diversity gain. To increase the diversity gain, each repetition should be evenly distributed over an entire frequency bandwidth.

To satisfy the above conditions, a PHICH group is transmitted in units of an REG consisting of 4 resource elements. The location of a transmission start REG of the PHICH is designated according to a cell ID and each repetition of the PHICH is arranged at an interval of a value obtained by dividing the number of REGs which can be transmitted by 3 based on the transmission start REG. However, when such a repetition of the PHICH is distributed over a plurality of OFDM symbols, the number of REGs which can be used for PHICH transmission in each OFDM symbol differs. That is because, in the first OFDM symbol, a physical control format indicator channel (PCFICH) for transmitting information including the number of OFDM symbols used for a control channel is transmitted, and because reference signals transmitted in the first and second OFDM symbols differ according to the number of transmit antennas. When the PHICH is transmitted through multiple OFDM symbols including different REGs, since the number of REGs in each OFDM symbol differs, repetitions of each PHICH are not evenly dispersed over an entire frequency bandwidth. The location of the first REG should be designated according to a cell ID and a repetitive pattern should be allocated at regular intervals based on an index of the first REG. However, since resolution of a frequency location depending on the index differs according to the number of REGs in each OFDM symbol, there exists a defect that a reference location is changed.

Therefore, when the PHICH is transmitted through multiple OFDM symbols, if the start location according to the cell ID is determined in consideration of a ratio of REGs of the first start symbol to REGs of the other symbols, the above problem can be solved. When the PHICH is transmitted through one or three OFDM symbols, the location of the first start symbol is always the first OFDM symbol. However, when the PHICH is transmitted through two OFDM symbols, the first PHICH group is started from the second OFDM symbol. Accordingly, if the ratio of REGs is considered, a reference symbol should be changed.

The above description may be expressed by the following equation 2.

$$\bar{n}_i = \begin{cases} (\lfloor (N_{ID}^{cell} \cdot n'_{l'_i}/n'_0) \rfloor + m') \bmod n'_{l'_i}, & i = 0 \\ (\lfloor (N_{ID}^{cell} \cdot n'_{l'_i}/n'_0) \rfloor + m' + \lfloor n'_{l'_i}/3 \rfloor) \bmod n'_{l'_i}, & i = 1 \\ (\lfloor (N_{ID}^{cell} \cdot n'_{l'_i}/n'_0) \rfloor + m' + \lfloor 2n'_{l'_i}/3 \rfloor) \bmod n'_{l'_i}, & i = 2 \end{cases} \quad \text{[Equation 2]}$$

In Equation 2, $\bar{n}_i$ denotes an index of an REG in which a repetitive pattern of each PHICH is transmitted, $N_{ID}^{cell}$ denotes a cell ID, n'$_{l'_i}$ denotes the number of REGs which can be used for PHICH transmission in an OFDM symbol l'$_i$, n'$_{l'_i}$/n'$_0$ denotes a ratio between the number of available resource element groups in an OFDM symbol l'$_i$ and the number of available resource element groups in a first OFDM symbol and is a parameter for solving a problem caused by the different number of REGs between symbols, and m' denotes an index of a PHICH is group as indicated in Equation 1. m' is desirably increased by 1.

Figure 11:
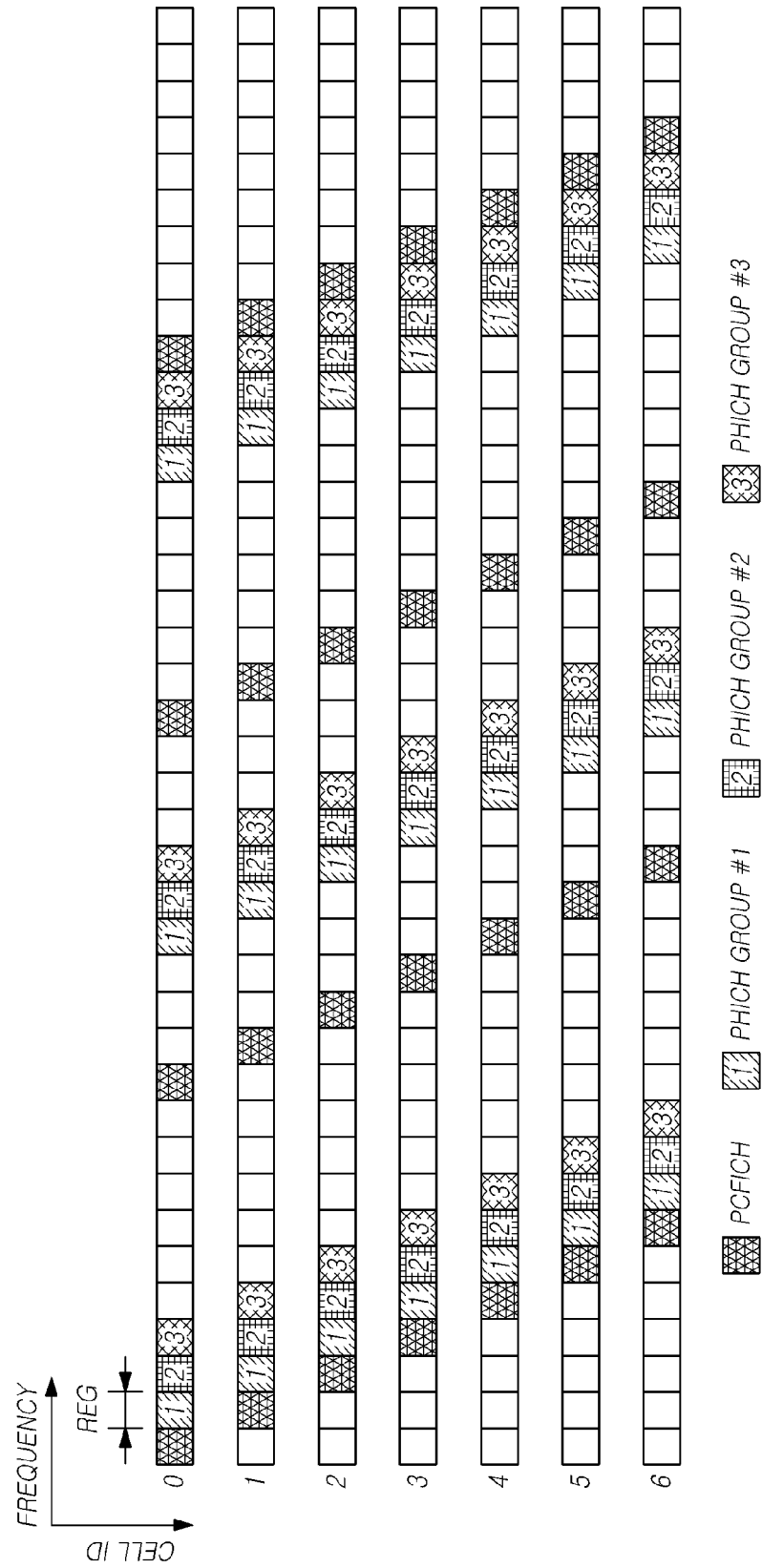
FIG. 11 illustrates an example of a PHICH mapping method according to an exemplary embodiment of the present invention.

FIG. 11 illustrates an example of a PHICH mapping method according to an exemplary embodiment of the present invention. As illustrated in FIG. 11, PHICH resource collision can be avoided based on cell planning.

If the PHICH is mapped from the second OFDM symbol, n'$_{l'_i}$/n'$_0$ is changed to n'$_{l'_i}$/n'$_1$. This may be expressed by the following Equation 3.

$$\bar{n}_i = \begin{cases} (\lfloor (N_{ID}^{cell} \cdot n'_{l'_i}/n'_1) \rfloor + m') \bmod n'_{l'_i}, & i = 0 \\ (\lfloor (N_{ID}^{cell} \cdot n'_{l'_i}/n'_1) \rfloor + m' + \lfloor n'_{l'_i}/3 \rfloor) \bmod n'_{l'_i}, & i = 1 \\ (\lfloor (N_{ID}^{cell} \cdot n'_{l'_i}/n'_1) \rfloor + m' + \lfloor 2n'_{l'_i}/3 \rfloor) \bmod n'_{l'_i}, & i = 2 \end{cases} \quad \text{[Equation 3]}$$

In Equation 3, $N_{ID}^{cell}$ denotes a cell ID, i denotes an index of a repetitive pattern, n'$_{l'_i}$/n'$_1$ denotes a ratio between the number of available resource element groups in an OFDM symbol l'$_i$ and the number of available resource element groups in a second OFDM symbol, and m' denotes an index of a PHICH group. As in Equation 2, m' is desirably increased by 1.

Meanwhile, the location of the first PHICH group is allocated and then the other PHICH groups may be mapped successively after the first PHICH group.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The present invention provides a mapping method for frequency and OFDM symbol regions of a signal transmitted on downlink in a cellular OFDM wireless packet communication system and may be applied to a 3GPP LTE system, etc.

Text Proposal disclosed in pages 6-7 of U.S. Provisional Application Ser. No. 61/029,895 and previously incorporated by reference into U.S. patent application Ser. Nos. 12/388,243 and 13/012,702.

6.9.3 Mapping to Resource Elements
The sequence $\bar{y}^{(p)}(0), \ldots, \bar{y}^{(p)}(M_{symb}-1)$ is defined by $$\bar{y}^{(p)}(n) = \Sigma y_i^{(p)}(n)$$

where the sum is over all PHICHs in a PHICH group and $y_i^{(p)}(n)$ represents the symbol sequence from the i:th PHICH in the PHICH group.

Let $z^{(p)}(i) = \langle y^{(p)}(4i), y^{(p)}(4i+1), y^{(p)}(4i+2), y^{(p)}(4i+3) \rangle$, $i=0, 1, 2$ denote symbol quadruplet i for antenna port p.
Mapping to resource elements is defined in terms of symbol quadruplets according to steps 1-9 below:
1) Initialize m'=0 (PHICH group number)
2) For each value of i=0, 1, 2
3) Symbol-quadruplet $z^{(p)}(i)$ from PHICH group m' is mapped to the resource-element group represented by $(k', l')_i$ as defined in Section 6.2.4 where the indices $k'_i$ and $l'_i$ are given by steps 4-7 below:
4) The time-domain $l'_i$ is given by $$l'_i = \begin{cases} 0 & \text{normal PHICH duration,} \\ & \text{all subframes} \\ i & \text{extended PHICH duration,} \\ & \text{non-MBSFN subframes} \\ (\lfloor m'/2 \rfloor + i + 1) \bmod 2 & \text{extended PHICH duration,} \\ & \text{MBSFN subframes} \end{cases}$$

5) Let $n'_{l'_i}$ denote the number of resource element groups not assigned to PCFICH in OFDM symbol $l'_i$
6) Number the resource-element groups not assigned to PCFICH in OFDM symbol $l'_i$ from 0 to $n'_{l'_i}-1$, starting from the resource-element group with the lowest frequency-domain index.
7) Set the frequency-domain index $k'_i$ to the resource-element group assigned the number $\bar{n}_i$, where $\bar{n}_i$ is given by $$\bar{n}_i = \begin{cases} (\lfloor (N_{ID}^{cell} \cdot n'_{l'_i} / n'_0) \rfloor + m') \bmod n'_{l'_i}, & i = 0 \\ (\lfloor (N_{ID}^{cell} \cdot n'_{l'_i} / n'_0) \rfloor + m' + \lfloor n'_{l'_i}/3 \rfloor) \bmod n'_{l'_i}, & i = 1 \\ (\lfloor (N_{ID}^{cell} \cdot n'_{l'_i} / n'_0) \rfloor + m' + \lfloor 2n'_{l'_i}/3 \rfloor) \bmod n'_{l'_i}, & i = 2 \end{cases}$$

if normal PHICH duration in all subframes or extended PHICH duration in MBSFN subframes, and by $$\bar{n}_i = \begin{cases} (\lfloor (N_{ID}^{cell} \cdot n'_{l'_i} / n'_1) \rfloor + m') \bmod n'_{l'_i}, & i = 0 \\ (\lfloor (N_{ID}^{cell} \cdot n'_{l'_i} / n'_1) \rfloor + m' + \lfloor n'_{l'_i}/3 \rfloor) \bmod n'_{l'_i}, & i = 1 \\ (\lfloor (N_{ID}^{cell} \cdot n'_{l'_i} / n'_1) \rfloor + m' + \lfloor 2n'_{l'_i}/3 \rfloor) \bmod n'_{l'_i}, & i = 2 \end{cases}$$

otherwise.
8) Increase m' by 1.
9) Repeat from step 2 until all PHICH groups have been assigned.

What is claimed is:

1. A method of a base station including a processor and a transmitter for transmitting a signal comprising acknowledgement/negative acknowledgement (ACK/NACK) mapped in at least two orthogonal frequency division multiplexing (OFDM) symbols, the method comprising:
   determining, at the processor, an index of a first resource element group (REG) in a first OFDM symbol based on a first ratio calculated using a number of available resource element groups (REGs) in the first OFDM symbol and a number of available REGs in a second OFDM symbol, the index of the first REG corresponding to a frequency domain location;
   mapping, at the processor, the ACK/NACK to the first REG in the first OFDM symbol according to the determined index of the first REG; and
   transmitting, at the transmitter, the signal comprising the mapped ACK/NACK,
   wherein available REGs are REGs not assigned to Physical Control Format Indicator Channel (PCFICH).

2. The method of claim 1, wherein an index of the first OFDM symbol corresponds to an OFDM symbol index l'=0, and an index of the second OFDM symbol corresponds to an OFDM symbol index l'=1.

3. The method of claim 2, wherein the first ratio is calculated as the number of available REGs in the first OFDM symbol to the number of available REGs in the second OFDM symbol.

4. The method of claim 2, further comprising:
   mapping the ACK/NACK to a second REG in the second OFDM symbol and to a third REG in the second OFDM symbol.

5. The method of claim 4, wherein an index $(\bar{n}_i)$ of an i-$^{th}$ REG to which the ACK/NACK is mapped is determined using the following equation:

$$\bar{n}_i = \begin{cases} (\lfloor (N_{ID}^{cell} \cdot n'_{l'_i} / n'_1) \rfloor + m') \bmod n'_{l'_i}, & i = 0 \\ (\lfloor (N_{ID}^{cell} \cdot n'_{l'_i} / n'_1) \rfloor + m' + \lfloor n'_{l'_i}/3 \rfloor) \bmod n'_{l'_i}, & i = 1 \\ (\lfloor (N_{ID}^{cell} \cdot n'_{l'_i} / n'_1) \rfloor + m' + \lfloor 2n'_{l'_i}/3 \rfloor) \bmod n'_{l'_i}, & i = 2 \end{cases}$$

where an index of the second REG in the second OFDM symbol corresponds to the index $(\bar{n}_0)$ of the i-$^{th}$ REG when i=0, the index of the first REG in the first OFDM symbol corresponds to the index $(\bar{n}_1)$ of the i-$^{th}$ REG when i=1, an index of the third REG in the second OFDM symbol corresponds to the index $(\bar{n}_2)$ of the i-$^{th}$ REG when i=2, $N_{ID}^{cell}$ denotes a cell ID, $l'_i$ denotes an index of an OFDM symbol comprising the i-$^{th}$ REG when i=0, 1, or 2, $n'_{l'_i}$ denotes a number of available REGs in an OFDM symbol having an index $l'_i$, $n'_1$ denotes a number of available REGs in an OFDM symbol having an index l'=1, and m' is determined based on an index of a physical hybrid automatic repeat request indicator channel (PHICH) group.

6. The method of claim 2, further comprising:
mapping the ACK/NACK to a second REG in the first OFDM symbol and to a third REG in the second OFDM symbol.

7. The method of claim 6, wherein an index ($\bar{n}_i$) of an i-$^{th}$ REG to which the ACK/NACK is mapped is determined using the following equation:

$$\bar{n}_i = \begin{cases} (\lfloor (N_{ID}^{cell} \cdot n'_{l'_i} / n'_1) \rfloor + m') \bmod n'_{l'_i}, & i = 0 \\ (\lfloor (N_{ID}^{cell} \cdot n'_{l'_i} / n'_1) \rfloor + m' + \lfloor n'_{l'_i} / 3 \rfloor) \bmod n'_{l'_i}, & i = 1 \\ (\lfloor (N_{ID}^{cell} \cdot n'_{l'_i} / n'_1) \rfloor + m' + \lfloor 2n'_{l'_i} / 3 \rfloor) \bmod n'_{l'_i}, & i = 2 \end{cases}$$

where the index of the first REG in the first OFDM symbol corresponds to the index ($\bar{n}_0$) of the i-$^{th}$ REG when i=0, an index of the third REG in the second OFDM symbol corresponds to the index ($\bar{n}_1$) of the i-$^{th}$ REG when i=1, an index of the second REG in the first OFDM symbol corresponds to the index ($\bar{n}_2$) of the i-$^{th}$ REG when i=2, $N_{ID}^{cell}$ denotes a cell ID, l'$_i$ denotes an index of an OFDM symbol comprising the i-$^{th}$ REG when i=0, 1, or 2, n'$_{l'_i}$ denotes a number of available REGs in an OFDM symbol having an index l'$_i$, n'$_1$ denotes a number of available REGs in an OFDM symbol having an index l'=1, and m' is determined based on an index of a physical hybrid automatic repeat request indicator channel (PHICH) group.

8. The method of claim 1, wherein an index of the first OFDM symbol corresponds to an OFDM symbol index l'=1, and an index of the second OFDM symbol corresponds to an OFDM symbol index l'=0.

9. The method of claim 8, further comprising:
mapping the ACK/NACK to a second REG in the second OFDM symbol;
determining an index of a third REG in a third OFDM symbol based on a second ratio calculated using the number of available REGs in the second OFDM symbol and a number of available REGs in the third OFDM symbol; and
mapping the ACK/NACK to the third REG in the third OFDM symbol according to the determined index of the third REG.

10. The method of claim 9, wherein the first ratio is calculated as the number of available REGs in the first OFDM symbol to the number of available REGs in the second OFDM symbol, and
the second ratio is calculated as the number of available REGs in the third OFDM symbol to the number of available REGs in the second OFDM symbol.

11. The method of claim 9, wherein an index ($\bar{n}_i$) of an i-$^{th}$ REG to which the ACK/NACK is mapped is determined using the following equation:

$$\bar{n}_i = \begin{cases} (\lfloor (N_{ID}^{cell} \cdot n'_{l'_i} / n'_0) \rfloor + m') \bmod n'_{l'_i}, & i = 0 \\ (\lfloor (N_{ID}^{cell} \cdot n'_{l'_i} / n'_0) \rfloor + m' + \lfloor n'_{l'_i} / 3 \rfloor) \bmod n'_{l'_i}, & i = 1 \\ (\lfloor (N_{ID}^{cell} \cdot n'_{l'_i} / n'_0) \rfloor + m' + \lfloor 2n'_{l'_i} / 3 \rfloor) \bmod n'_{l'_i}, & i = 2 \end{cases}$$

where the index of the second REG in the second OFDM symbol corresponds to the index ($\bar{n}_0$) of the i-$^{th}$ REG when i=0, the index of the first REG in the first OFDM symbol corresponds to the index ($\bar{n}_1$) of the i-$^{th}$ REG when i=1, the index of the third REG in the third OFDM symbol corresponds to the index ($\bar{n}_2$) of the i-$^{th}$ REG when i=2, $N_{ID}^{cell}$ denotes a cell ID, l'$_i$ denotes an index of an OFDM symbol comprising the i-$^{th}$ REG when i=0, 1, or 2, n'$_{l'_i}$ denotes a number of available REGs in an OFDM symbol having an index l'$_i$, n'$_0$ denotes a number of available REGs in an OFDM symbol having an index l'=0, and m' is determined based on an index of a physical hybrid automatic repeat request indicator channel (PHICH) group.

12. The method of claim 1, wherein the number of available REGs in the first OFDM symbol is defined as a number of REGs not assigned to PCFICH in the first OFDM symbol, and
the number of available REGs in the second OFDM symbol is defined as a number of REGs not assigned to PCFICH in the second OFDM symbol.

13. An apparatus to transmit a signal comprising acknowledgement/negative acknowledgement (ACK/NACK) mapped in at least two orthogonal frequency division multiplexing (OFDM) symbols, the apparatus comprising:
a processor configured to determine an index of a first resource element group (REG) in a first OFDM symbol based on a first ratio calculated using a number of available resource element groups (REGs) in the first OFDM symbol and a number of available REGs in a second OFDM symbol, and to map acknowledgement/negative acknowledgement (ACK/NACK) to the first REG according to the determined index of the first REG, the index of the first REG corresponding to a frequency domain location; and
a transmitter to transmit the signal comprising the mapped ACK/NACK.

14. The apparatus of claim 13, wherein the number of available REGs in the first OFDM symbol is defined as a number of REGs not assigned to Physical Control Format Indicator Channel (PCFICH) in the first OFDM symbol, and
the number of available REGs in the second OFDM symbol is defined as a number of REGs not assigned to PCFICH in the second OFDM symbol.

15. The apparatus of claim 13, wherein an index of the first OFDM symbol corresponds to an OFDM symbol index l'=0, and an index of the second OFDM symbol corresponds to an OFDM symbol index l'=1, and
wherein the processor is configured to map the ACK/NACK to a second REG in the second OFDM symbol and to a third REG in the second OFDM symbol.

16. The apparatus of claim 15, wherein an index ($\bar{n}_i$) of an i-$^{th}$ REG to which the ACK/NACK is mapped is determined using the following equation:

$$\bar{n}_i = \begin{cases} (\lfloor (N_{ID}^{cell} \cdot n'_{l'_i} / n'_1) \rfloor + m') \bmod n'_{l'_i}, & i = 0 \\ (\lfloor (N_{ID}^{cell} \cdot n'_{l'_i} / n'_1) \rfloor + m' + \lfloor n'_{l'_i} / 3 \rfloor) \bmod n'_{l'_i}, & i = 1 \\ (\lfloor (N_{ID}^{cell} \cdot n'_{l'_i} / n'_1) \rfloor + m' + \lfloor 2n'_{l'_i} / 3 \rfloor) \bmod n'_{l'_i}, & i = 2 \end{cases}$$

where an index of the second REG in the second OFDM symbol corresponds to the index ($\bar{n}_0$) of the i-$^{th}$ REG when i=0, the index of the first REG in the first OFDM symbol corresponds to the index ($\bar{n}_1$) of the i-$^{th}$ REG when i=1, an index of the third REG in the second OFDM symbol corresponds to the index ($\bar{n}_2$) of the i-$^{th}$ REG when i=2, $N_{ID}^{cell}$ denotes a cell ID, l'$_i$ denotes an index of an OFDM symbol comprising the i-$^{th}$ REG when i=0, 1, or 2, n'$_{l'_i}$ denotes a number of available REGs in an OFDM symbol having an index l'$_i$, n'$_1$ denotes a number of available REGs in an OFDM symbol having an index l'=1, and m' is determined based on an index of a physical hybrid automatic repeat request indicator channel (PHICH) group.

17. The apparatus of claim 13, wherein an index of the first OFDM symbol corresponds to an OFDM symbol index l'=0, and an index of the second OFDM symbol corresponds to an OFDM symbol index l"=1, and
wherein the processor is configured to map the ACK/NACK to a second REG in the first OFDM symbol and to a third REG in the second OFDM symbol.

18. The apparatus of claim 17, wherein an index ($\bar{n}_i$) of an i-$^{th}$ REG to which the ACK/NACK is mapped is determined using the following equation:

$$\bar{n}_i = \begin{cases} (\lfloor (N_{ID}^{cell} \cdot n'_{l'_i} / n'_1) \rfloor + m') \bmod n'_{l'_i}, & i = 0 \\ (\lfloor (N_{ID}^{cell} \cdot n'_{l'_i} / n'_1) \rfloor + m' + \lfloor n'_{l'_i} / 3 \rfloor) \bmod n'_{l'_i}, & i = 1 \\ (\lfloor (N_{ID}^{cell} \cdot n'_{l'_i} / n'_1) \rfloor + m' + \lfloor 2n'_{l'_i} / 3 \rfloor) \bmod n'_{l'_i}, & i = 2 \end{cases}$$

where the index of the first REG in the first OFDM symbol corresponds to the index ($\bar{n}_0$) of the i-$^{th}$ REG when i=0, an index of the third REG in the second OFDM symbol corresponds to the index ($\bar{n}_1$) of the i-$^{th}$ REG when i=1, an index of the second REG in the first OFDM symbol corresponds to the index ($\bar{n}_2$) of the i-$^{th}$ REG when i=2, $N_{ID}^{cell}$ denotes a cell ID, l'$_i$ denotes an index of an OFDM symbol comprising the i-$^{th}$ REG when i=0, 1, or 2, n'$_{l'_i}$ denotes a number of available REGs in an OFDM symbol having an index l'$_i$, n'$_1$ denotes a number of available REGs in an OFDM symbol having an index l'=1, and m' is determined based on an index of a physical hybrid automatic repeat request indicator channel (PHICH) group.

19. The apparatus of claim 13, wherein an index of the first OFDM symbol corresponds to an OFDM symbol index l'=1, and an index of the second OFDM symbol corresponds to an OFDM symbol index l'=0,
wherein the processor is configured to map the ACK/NACK to a second REG in the second OFDM symbol, to determine an index of a third REG in a third OFDM symbol based on a second ratio calculated using the number of available REGs in the second OFDM symbol and a number of available REGs in the third OFDM symbol, and to map the ACK/NACK to the third REG in the third OFDM symbol according to the determined index of the third REG, and
wherein an index ($\bar{n}_i$) of an i-$^{th}$ REG to which the ACK/NACK is mapped is determined using the following equation:

$$\bar{n}_i = \begin{cases} (\lfloor (N_{ID}^{cell} \cdot n'_{l'_i} / n'_0) \rfloor + m') \bmod n'_{l'_i}, & i = 0 \\ (\lfloor (N_{ID}^{cell} \cdot n'_{l'_i} / n'_0) \rfloor + m' + \lfloor n'_{l'_i} / 3 \rfloor) \bmod n'_{l'_i}, & i = 1 \\ (\lfloor (N_{ID}^{cell} \cdot n'_{l'_i} / n'_0) \rfloor + m' + \lfloor 2n'_{l'_i} / 3 \rfloor) \bmod n'_{l'_i}, & i = 2 \end{cases}$$

where an index of the second REG in the second OFDM symbol corresponds to the index ($\bar{n}_0$) of the i-$^{th}$ REG when i=0, the index of the first REG in the first OFDM symbol corresponds to the index ($\bar{n}_1$) of the i-$^{th}$ REG when i=1, the index of the third REG in the third OFDM symbol corresponds to the index ($\bar{n}_2$) of the i-$^{th}$ REG when i=2, $N_{ID}^{cell}$ denotes a cell ID, l'$_i$ denotes an index of an OFDM symbol comprising the i-$^{th}$ REG when i=0, 1, or 2, n'$_{l'_i}$ denotes a number of available REGs in an OFDM symbol having an index l'$_i$, n'$_0$ denotes a number of available REGs in an OFDM symbol having an index l'=0, and m' is determined based on an index of a physical hybrid automatic repeat request indicator channel (PHICH) group.

20. A method of a base station including a processor and a transmitter for transmitting a signal comprising acknowledgement/negative acknowledgement (ACK/NACK) mapped in at least two orthogonal frequency division multiplexing (OFDM) symbols, the method comprising:
determining, by the processor, an index of a first resource element group (REG) in a first OFDM symbol based on a first ratio calculated using a number of available resource element groups (REGs) in the first OFDM symbol and a number of available REGs in a second OFDM symbol, the index of the first REG corresponding to a frequency domain location;
mapping, by the processor, the ACK/NACK to the first REG in the first OFDM symbol according to the determined index of the first REG;
mapping, by the processor, the ACK/NACK to a second REG in the second OFDM symbol and to a third REG, the third REG being included in the first OFDM symbol, the second OFDM symbol, or a third OFDM symbol; and
transmitting, by the transmitter, the signal comprising the mapped ACK/NACK,
wherein a number of available REGs in an OFDM symbol is defined as a number of REGs not assigned to Physical Control Format Indicator Channel (PCFICH) in an OFDM symbol.

* * * * *